US007110733B1

(12) United States Patent
Aoyama

(10) Patent No.: US 7,110,733 B1
(45) Date of Patent: Sep. 19, 2006

(54) ARRAY ANTENNA RADIO COMMUNICATION APPARATUS AND WEIGHT COEFFICIENT GENERATING METHOD

(75) Inventor: Takahisa Aoyama, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 764 days.

(21) Appl. No.: 09/868,699

(22) PCT Filed: Oct. 19, 2000

(86) PCT No.: PCT/JP00/07263

§ 371 (c)(1),
(2), (4) Date: Jun. 20, 2001

(87) PCT Pub. No.: WO01/29989

PCT Pub. Date: Apr. 26, 2001

(30) Foreign Application Priority Data

Oct. 21, 1999 (JP) ............................... H11-299051

(51) Int. Cl.
*H04B 17/02* (2006.01)
(52) U.S. Cl. ...................... 455/137; 455/25; 455/562.1
(58) Field of Classification Search ............. 455/562.1, 455/342, 25, 63.4, 137
See application file for complete search history.

(56) References Cited

U.S. PATENT DOCUMENTS 6,087,986 A * 7/2000 Shoki et al. ................. 342/383
6,115,409 A * 9/2000 Upadhyay et al. .......... 375/144
6,141,567 A * 10/2000 Youssefmir et al. ...... 455/562.1
6,636,493 B1 * 10/2003 Doi et al. .................... 370/332

FOREIGN PATENT DOCUMENTS

| GB | 2328800 | 3/1999 |
| JP | 57020001 | 2/1982 |
| JP | 06196921 | 7/1994 |
| JP | 07170117 | 7/1995 |
| JP | 09232848 | 9/1997 |
| JP | 11142497 | 5/1999 |
| JP | 2000082987 | 3/2000 |
| JP | 2000216724 | 8/2000 |

OTHER PUBLICATIONS

European Office Action dated Nov. 28, 2005.
Kyeong et al., "Outdoor Communications Using Adaptive Arrays in CDMA Mobile Systems," Vehicular Technology Conference, 1999 IEEE 49th Houston, TX, USA, vol. 1, May 16, 1999, pp. 264-268, XP010341992.
P. M. Grant, et al., "Adaptive Arrays for Narrowband CDMA Base Stations," Electronics and Communication Engineering Journal, Institution of Electrical Engineers, London, GB, vol. 10, No. 4, Aug. 1998, pp. 156-166, XP000848705.

* cited by examiner

*Primary Examiner*—Bing Q. Bui
(74) *Attorney, Agent, or Firm*—Stevens, Davis, Miller & Mosher, LLP

(57) ABSTRACT

Null detectors 108-1 to 108-3 detect the directions of null points of the respective radiation patterns formed for mobile stations 101-1 to 101-3 and output information indicative of detected null-point directions to notifying section 109, notifying section 109 notifies estimators 110-1 to 110-3 of all null information, and estimators 110-1 to 110-3 estimate the directions where mobile stations that cause interference with the respective stations 101-1 to 101-3 exist, and generate reception weights using null information.

7 Claims, 4 Drawing Sheets

ARRAY ANTENNA RADIO COMMUNICATION APPARATUS AND WEIGHT COEFFICIENT GENERATING METHOD

TECHNICAL FIELD

The present invention relates to an array antenna radio communication apparatus and a weight coefficient generating method.

BACKGROUND ART

An array antenna radio communication apparatus is a radio communication apparatus that comprises a plurality of antennas and is capable of setting directivity freely by making an adjustment of each of amplitude and a phase to signals received via the respective antennas. The adjustments of amplitude and the phase to a received signal is carried out by multiplying the received signal by weight coefficient (hereinafter referred to as "weight").

The array antenna radio communication apparatus adjusts weights to multiply, making it possible to receive only a signal incoming from a desired direction intensively. It is thereby possible for the array antenna radio communication apparatus to maintain a reception SIR (Signal to Interface Ratio) on the signal incoming from the desired direction.

The conventional array antenna radio communication apparatus, however, has the following problems when it is applied to a mobile communication base station apparatus (hereinafter referred to "base station") used in a CDMA radio communication system.

More specifically, in the CDMA radio communication system, communication between the base station and each mobile communication terminal apparatus (hereinafter referred to as "mobile station") is performed in such a way that a different spread code is assigned to each mobile station and the same frequency band is used at each mobile station.

In the case where a mobile station that transmits signals having high reception power in the base station and a mobile station that transmits signals having low reception power in the base station exist, the signals having high reception power cause interference with signals having low reception power since communications are performed using the same frequency band. For this reason, the base station cannot maintain the reception SIR of signals having low reception power high, with the result that the base station cannot find out the direction where the mobile station that transmits signals having low reception power exists.

Accordingly, this causes a problem in which the base station can form directivity to the mobile station that transmits signals having high reception power but cannot form directivity to the mobile station that transmits signals having low reception power.

Further, in the case where the base station cannot form directivity to the mobile station that transmits signals having low reception power, the base station transmits signals in all directions when transmitting signals to the mobile station that transmits signals having low reception power. This causes a problem in which the signals, which are sent to the mobile station that transmits signals with low reception power, result in interference signals with other mobile stations.

Furthermore, in the base station that performs weight control using an algorithm of MMSE (Minimum Mean Square Error) standard, the signals with low reception power do not occur interference with the signals with high reception power in some instances. In this case, the base station can maintain reception SIR of signals with high reception power sufficiently high without forming directivity to the mobile station that transmits signals with high reception power. Namely, the base station does not form directivity to the mobile station that transmits signals with high reception power. In the case where the base station does not form directivity to the mobile station that transmits signals with high reception power, the base station transmits signals in all directions when transmitting signals to the mobile station that transmits signals with high reception power. Hence, this causes a problem in which the signals, which are sent to the mobile station that transmits signals with high reception power, result in interference signals with other mobile stations.

DISCLOSURE OF INVENTION

It is an object of the present invention is to provide an array antenna radio communication apparatus capable of forming directivity with an excellent convergence to a mobile station to which the directivity is not formed yet, and relates to a weight coefficient generating method.

The inventor of the present invention has found out that reception weights and radiation patterns can be formed to the mobile station to which the directivity is not formed yet by use of the radiation patterns formed to the other mobile station.

Namely, in order to achieve the above object, the present invention detects a null point of the radiation pattern formed to the other mobile station and estimates the direction where the other mobile station exists based on the null point, whereby forming a radiation pattern to the mobile station to which the directivity is not formed yet.

BEST MODE FOR CARRYING OUT THE INVENTION

Embodiments of the present invention will be specifically described with reference to drawings accompanying herewith.

First Embodiment

Assuming that mobile stations that transmit interference signals exist in the directions serving as null points of radiation patterns with respect to a mobile station to which the directivity is formed already. In other words, it can be considered that other mobile stations exist in the directions serving as a null point. Hence, according to the embodiment of the present invention, the null points of radiation patterns formed to the other mobile stations are detected to estimate the directions where the other mobile stations exist, generating weights to the mobile station to which the directivity is not formed yet so as to form radiation patterns using the weights as reception weights.

Figure 1:
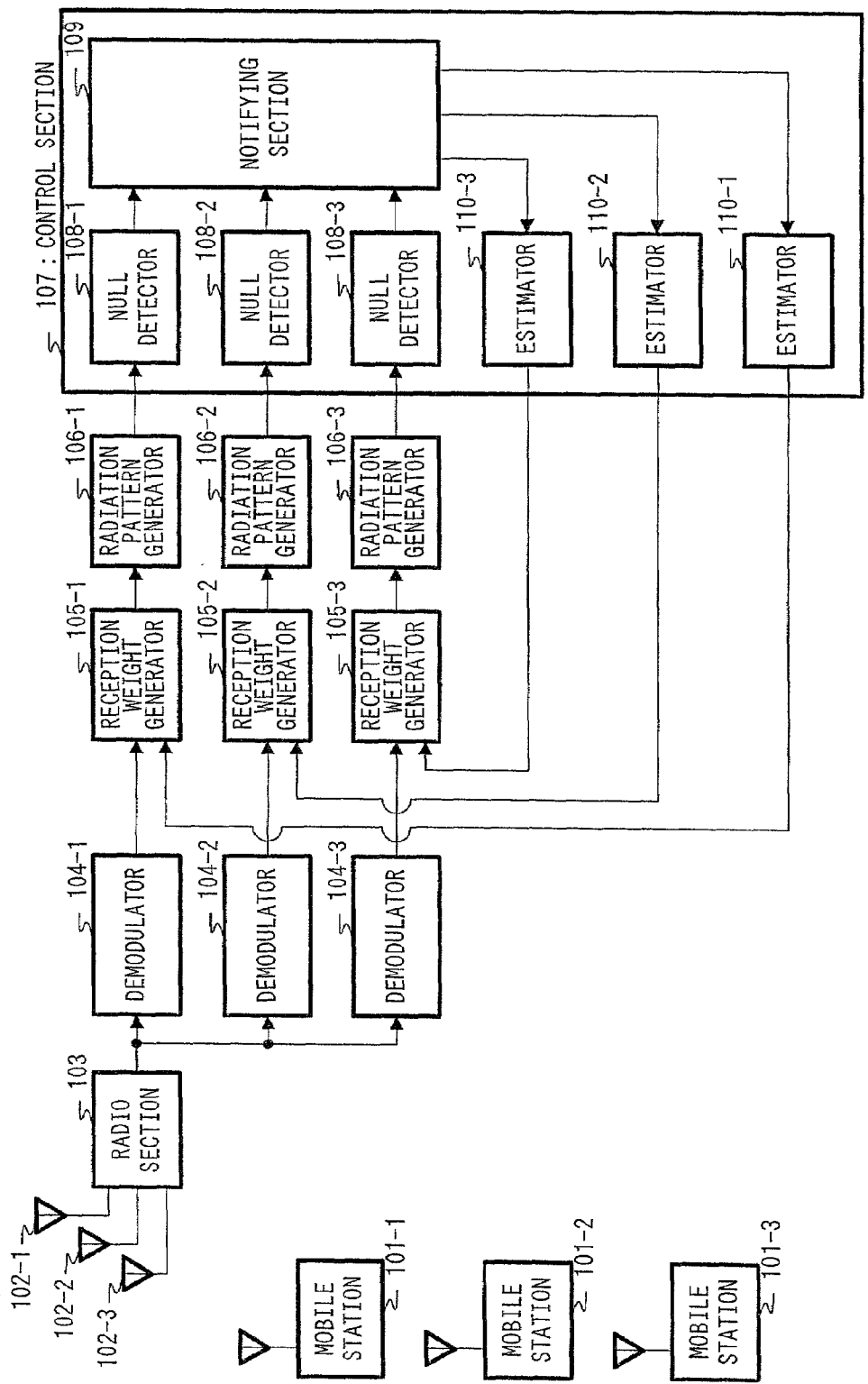
FIG. 1 is a block diagram of main parts illustrating a general configuration of an array antenna radio communication apparatus according to the first embodiment of the present invention.

An explanation will be given of the array antenna radio communication apparatus and weight coefficient generating method according to the first embodiment of the present invention. FIG. 1 is a block diagram of main parts illustrating a general configuration of the array antenna radio communication apparatus according to the first embodiment of the present invention. It is noted that the array antenna radio communication apparatus illustrated in FIG. 1 is one that is normally provided in the base station. Hence, the following explanation is given on the assumption that communications between the mobile station and the array antenna radio communication apparatus are performed.

In FIG. 1, each of mobile stations 101-1 to 101-3 is the mobile station that performs communications with the array antenna radio communication apparatus A radio section 103 provides predetermined radio processing to signals received via antennas 102-1 to 102-3. Demodulators 104-1 to 104-3 multiply received signals by spread codes assigned to the mobile stations 101-1 to 101-3, respectively, and provide demodulation processing to the received signals for each antenna. Reception weight generators 105-1 to 105-3 provide adaptive signal processing to the demodulated signals for each antenna, thereby generating reception weights. Radiation pattern generators 106-1 to 106-3 generate radiation patterns using generated reception weights.

A control section 107 controls reception weights based on radiation patterns already formed. Null detectors 108-1 to 108-3 detect the null-point directions of the respective radiation patterns formed to the mobile stations 101-1 to 101-3. Then, they output information (hereinafter referred to as "null information"), indicative of detected null-point directions, to a notifying section 109. The notifying section 109 notifies estimators 110-1 to 110-3 of all null information. The estimators 110-1 to 110-3 estimate the directions where mobile stations that cause interference with the respective mobile stations 101-1 to 101-3 exist, and generate reception weights such that the respective null points are directed to the estimated directions using null information. The generated reception weights are used as initial values of reception weights at the reception weight generators 105-1 to 105-3, respectively.

Figure 2:
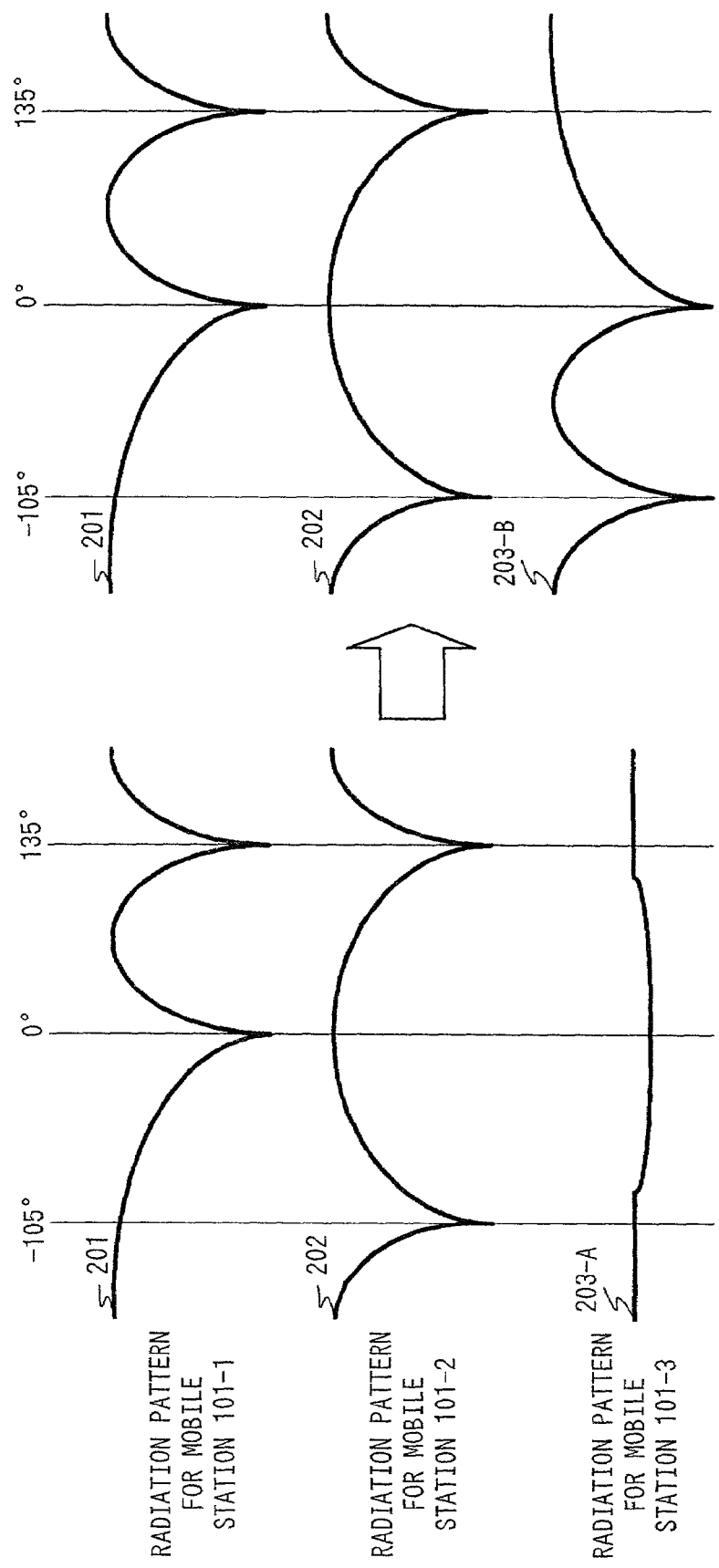
FIG. 2A is a view illustrating a state that radiation patterns are formed by the array antenna radio communication apparatus according to the first embodiment of the present invention.
FIG. 2B is a view illustrating a state that radiation patterns are formed by the array antenna radio communication apparatus according to the second embodiment of the present invention.

An explanation will be next given of the actions of the array antenna radio communication apparatus having the aforementioned configuration. FIGS. 2A and 2B are views each illustrating a state that radiation patterns are formed by the array antenna radio communication apparatus according to the first embodiment of the present invention.

Herein, assuming that directivity is already formed as illustrated in radiation patterns 201 and 202 regarding the mobile stations 101-1 and 101-2. Also, supposing that directivity has not been formed yet as illustrated in a radiation pattern 203-A regarding the mobile stations 101-3.

First, the null detector 108-1 detects the null-point direction of the radiation pattern 201 generated by the radiation pattern generator 106-1. More specifically, the null detector 108-1 detects 0. and 135. as null-point directions, and outputs them to the notifying section 109 as null information 1.

Further, the null detector 108-2 detects the null-point direction of the radiation pattern 202 generated by the radiation pattern generator 106-2. More specifically, the null detector 108-2 detects −105. and 135. as null-point directions, and outputs them to the notifying section 109 as null information 2.

In addition, the null detector 108-3 cannot detect the null-point direction from the radiation pattern 203-A generated by the radiation pattern generator 106-3. Hence, the null detector 108-3 outputs information, indicating impossibility of detection, to the notifying section 109.

The notifying section 109 judges that directivity relating to the mobile station 101-3 has not yet been formed based on information indicating impossibility of detection. Then, the notifying section 109 outputs null information 1 and null information 2 to the estimator 110-3 corresponding to the mobile station 101-3.

The estimator 110-3 estimates the directions where the mobile stations 101-1 and 101-2, each causing interference with the mobile station 101-3, exist in the following way.

Namely, the estimator 110-3 estimates that there is the mobile station 101-2 or mobile station 101-3 that causes interference with the mobile station 101-1 in the direction of 0. or 135. based on null information 1.

Also, the estimator 110-3 estimates that there is the mobile station 101-1 or mobile station 101-3 that causes interference with the mobile station 101-2 in the directions of −105. or 135. based on null information 2.

After that, the estimator 110-3 estimates that there is the mobile station 101-3 in the direction of 135. where all null points lie on upon another based on comparison between null information 1 and null information 2. The estimator 110-3 also estimates that there is the mobile station 101-1 or mobile station 101-2 that causes interference with the mobile station 101-3 in the directions where null points are formed except the direction of 135 ., namely, −105. and 0..

Then, the estimator 110-3 generates a reception weight such that the radiation pattern indicated by 203-B is formed, that is, the radiation pattern where the nulls are directed to the directions of −105 . and 0. and a beam is directed to the direction of 135. based on the estimation result. The estimator 110-3 outputs the generated reception weight to the reception weight generator 105-3 as an initial value of reception weight. The reception weight generator 105-3 sequentially updates the reception weight using the reception weight generated by the estimator 110-3 as an initial value.

Additionally, as an algorithm that is used to generate the reception weight, there is an adaptive array with directional constraint (DCMP adaptive array) that can form a radiation pattern which directs the beam to the direction where a desired mobile station exists and which directs the null to the direction where a mobile station that causes interference exists.

Thus, according to the array antenna radio communication apparatus and the weight coefficient generating method of this embodiment, the null points of the radiation patterns formed to the other mobile stations are detected to estimate the directions where the other mobile stations exist, whereby generating a weight with respect to the mobile station to which the directivity is not formed yet and forming a radiation pattern using the weight as a reception weight. This makes it possible to form directivity with high accuracy in a short time with respect to the mobile station to which the directivity is not formed yet.

Second Embodiment

In the array antenna radio communication apparatus and the weight coefficients generating method according to this embodiment, the reception quality in the case of using the radiation pattern, which is already formed, is compared with the reception quality in the case of not using the radiation pattern, which is already formed. Whereby, a weight with respect to the mobile station to which the directivity is not formed yet is generated, and the radiation pattern is formed using the weight as a reception weight.

In the first embodiment, since the radiation patterns of the mobile station 101-1 and the mobile station 101-2 are formed, the radiation pattern of the mobile station 101-3 can be formed. However, in the case where the radiation pattern of the mobile station 101-1 or the mobile station 101-2 is not formed, the radiation pattern of the mobile station 101-3 cannot be formed in the first embodiment.

Now, for example, supposing that the radiation pattern of the mobile station 101-2 is not formed. The radiation pattern of the mobile station 101-3 must be formed using only null information 1 because no null information 2 exists. However, it is impossible to estimate in which of directions 0. and 135. the mobile station 101-2 exists by use of only null information 1. For this reason, it is impossible to judge in which direction the null point should be formed regarding the radiation pattern of the mobile station 101-3.

Hence, according to this embodiment, the reception quality using the radiation pattern of the mobile station 101-1, which is already formed, is compared with the reception quality using no radiation pattern of the mobile station 101-1, which is already formed, thereby forming the radiation pattern to the mobile station 101-3 to which the directivity is not formed yet.

Figure 3:
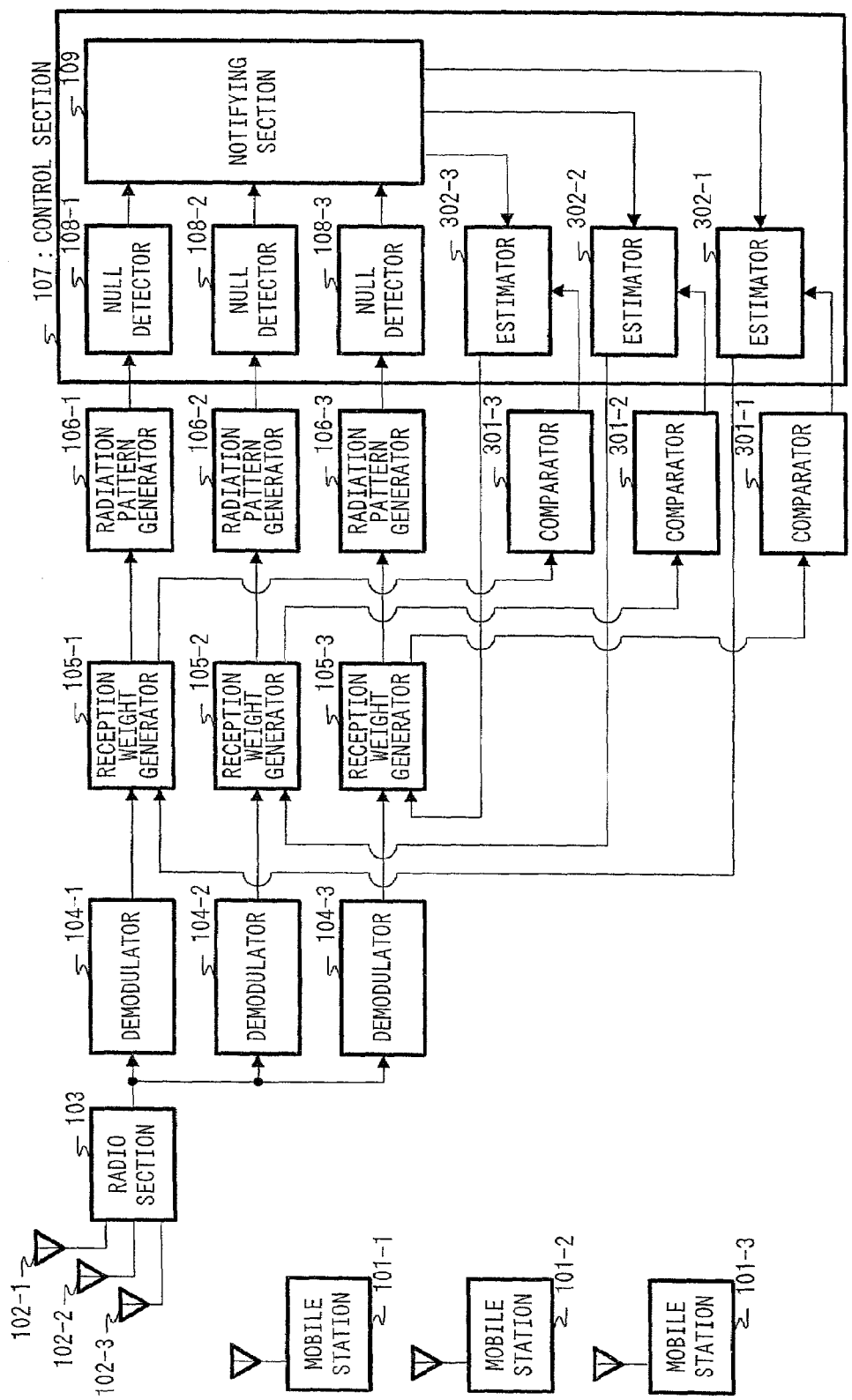
FIG. 3 is a block diagram of main parts illustrating a general configuration of an array antenna radio communication apparatus according to the second embodiment of the present invention.

FIG. 3 is a block diagram of main parts illustrating a general configuration of an array antenna radio communication apparatus according to the second embodiment of the present invention. In addition, some portions in this embodiment are assigned the same symbols as those of corresponding portions in the first embodiment and its explanation is omitted.

Comparators 301-1 to 301-3 compare the reception qualities of received signals multiplied in the reception weight generators 105-1 to 105-3 by initial values of reception weights estimated by the estimators 302-1 to 302-3 with the reception qualities of received signals to which such multiplication is not performed, respectively. Herein, the reception quality refers to SIR of received signals or reception power etc.

An explanation will be next given of the actions of the array antenna radio communication apparatus having the aforementioned configuration. Herein, supposing that only the radiation pattern of the mobile station 101-1 is already formed and that the radiation pattern of the mobile station 101-3 is formed based on this radiation pattern.

The notifying section 109 outputs null information 1 to the estimator 302-3 corresponding to the mobile station 101-3. The estimator 302-3 generates a reception weight such that the radiation pattern is formed where the null points are formed in the same directions as the directions of null points (0. and 135.) indicated by null information 1, and outputs the generated reception weight to the reception weight generator 105-3 as an initial value of the reception weight.

The reception weight generator 105-3 outputs a signal obtained by multiplying the received signal by the initial value of the reception weight and a signal which is not subjected to the multiplication to the comparator 301-3. The comparator 301-3 measures the reception quality of the signal obtained by multiplying the received signal by the initial value of the reception weight and the reception quality of the signal which is not subjected to the multiplication to compare. Then, the comparator 301-3 sends the comparison result to the estimator 302-3.

In the case where the reception quality of the signal obtained by multiplying the received signal by the initial value of the reception weight is better than the reception quality of the signal which is not subjected to the multiplication, the estimator 302-3 judges that there is a mobile station that causes interference with the mobile station 101-3 in the direction where the null point is formed, and outputs the initial value of the reception weight to the reception weight generator 105-3 without updating it.

While, in the case where the reception quality of the signal obtained by multiplying the received signal by the initial value of the reception weight is poorer than the reception quality of the signal which is not subjected to the multiplication, the estimator 302-3 judges that there is the mobile station 101-3 as a target of directivity to be formed in the direction where the null point has been formed. Then, the estimator 302-3 newly generates a reception weight such that the radiation pattern is formed where the null points are formed in the directions other than the directions (0. and 135.) indicated by null information 1, and outputs the newly generated reception weight as an updated initial value of reception value to the reception weight generator 105-3.

Now, herein, the case in which the reception quality of the signal obtained by multiplying the received signal by the initial value of the reception weight is better than the reception quality of the signal which is not subjected to the multiplication is as follows. Namely, SIR or reception power of the multiplied signal is higher than that of the non-multiplied signal. The case in which the reception quality of the signal obtained by multiplying the received signal by the initial value of the reception weight is poorer than the reception quality of the signal which is not subjected to the multiplication is as follows. Namely, SIR or reception power of the multiplied signal is below that of the non-multiplied signal.

Additionally, in the case where weight control is performed using the algorithm of MMSE standard, an error between the received signal and a reference signal may be used in place of SIR or reception power to make it possible to carry out the aforementioned judgment in accordance with the value of the error.

Thus, according to the array antenna radio communication apparatus and the weight coefficients generating method of this embodiment, the reception quality in the case of using the radiation pattern, which is already formed, is compared with the reception quality in the case of not using the radiation pattern, which is already formed. Whereby, a weight with respect to the mobile station to which the directivity is not formed yet is generated, and the radiation pattern is formed using the weight as a reception weight. This makes it possible to form directivity having high accuracy in a short time with respect to the mobile station to which the directivity is not formed yet even in the case where a plurality of mobile stations to which the directivities are not formed yet exist.

Third Embodiment

In the array antenna radio communication apparatus and the weight coefficients generating method according to this embodiment, transmission weights are generated using reception weights estimated from the radiation patterns of the other mobile stations.

Figure 4:
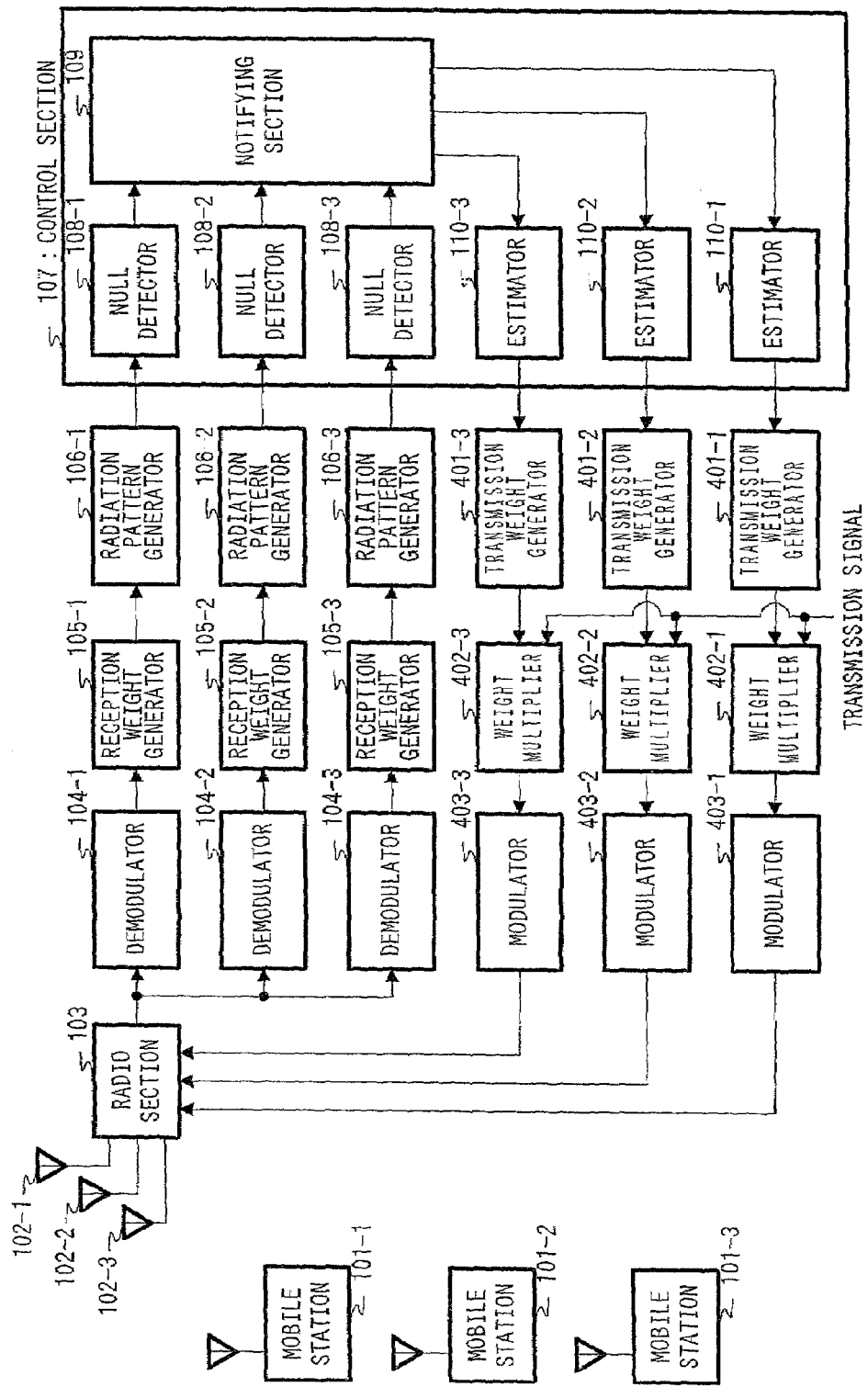
FIG. 4 is a block diagram of main parts illustrating a general configuration of an array antenna radio communication apparatus according to the third embodiment of the present invention.

FIG. 4 is a block diagram of main parts illustrating a general configuration of an array antenna radio communication apparatus according to the third embodiment of the present invention. In addition, some portions in this embodiment are assigned the same symbols as those of corresponding portions in the first embodiment and its explanation is omitted.

Transmission weight generators 401-1 to 401-3 generate transmission weights using initial values of reception weights generated by the estimators 110-1 to 110-3. Weight multipliers 402-1 to 402-3 multiply transmission signals by the transmission weights, respectively. Modulators 403-1 to 403-3 multiply the transmission signals by spread codes to provide predetermined modulation processing to the transmission signals. The radio section 103 provides predetermined radio processing to the modulated transmission signals and transmits them to the mobile stations 101-1 to 101-3 via the antennas 102-1 to 102-3.

An explanation will be next given of the actions of the array antenna radio communication apparatus having the aforementioned configuration.

The estimator 110-3 generates a reception weight such that the radiation pattern indicated by 203-B of FIG. 2B is formed, that is, the radiation pattern where the null points are formed in the directions of −105. and 0. and the directivity is formed in the direction of 135. based on the estimation result. The estimator 110-3 outputs the reception weight to the transmission weight generator 401-3.

The transmission weight generator 401-3 generates a transmission weight using the reception weight with consideration given to a frequency difference of transmission and reception. The weight multiplier 402-3 multiplies the transmission signal by the generated transmission weight. Whereby, the transmission signal provided with the directivity is transmitted from the radio section 103 via antennas 102-1 to 102-3.

Thus, according to the array antenna radio communication apparatus and the weight coefficients generating method of this embodiment, the transmission weight is generated using the reception weight estimated based on the radiation patterns of the other mobile stations. This makes it possible to transmit a signal to the mobile station on which has not been generated the reception weight yet with the directivity that does not cause interference with the other mobile stations.

In addition, the aforementioned first to third embodiments may be suitably combined and carried out.

As explained above, according to the present invention, it is possible to form directivity with an excellent convergence to the mobile station to which the directivity is not formed yet.

The application is based on the Japanese Patent Application No. HEI 11-299051 filed on Oct. 21, 1999, entire content of which expressly incorporated by reference herein.

INDUSTRIAL APPLICABILITY

The present invention is applicable to a base station apparatus used in a mobile communication system.

The invention claimed is:

1. A radio communication apparatus comprising:
   a detector that detects a null in a directivity pattern that is formed toward a first communicating party;
   an estimator that provides an estimation result of a direction of a second communicating party, to which a directivity pattern has not formed, from the null detected by said detector; and
   a generator that generates a directivity pattern toward the second communicating party according to said estimation result.

2. The radio communication apparatus of claim 1, wherein:
   the detector detects whether a null is present in respective directivity patterns of a plurality of first communicating parties that have formed toward said respective first communicating parties;
   the estimator compares the directivity patterns corresponding respectively to said plurality of first communicating parties and estimates that a source of interference against the second communicating party is present in a direction where (I) a null forms in at least one of the directivity patterns of the first communicating parties and (ii) a null does not form in at least one of the directivity patterns of the first communicating parties; and
   the generator generates said directivity pattern toward said second communicating party having a null in the direction where said source of interference is estimated to be present.

3. The radio communication apparatus of claim 1, wherein:
   the detector detects nulls in respective directivity patterns of a plurality of first communicating parties that have formed toward said respective first communicating parties;
   the estimator compares the directivity patterns corresponding respectively to said plurality of first communicating parties and estimates that the second communicating party is present in a direction where a null forms in all the directivity patterns of the first communicating parties; and
   the generator said directivity pattern toward said second communicating party having a beam in the direction in which said second communicating party is estimated to be present.

4. The radio communication apparatus of claim 1, further comprising a comparator that compares a first reception quality, obtained when the directivity pattern towards the first communicating party is in use, and a second reception quality, obtained when said directivity pattern toward the first communicating party is not in use, wherein the estimator estimates the direction of the second communicating party, based on the comparison result.

5. The radio communication apparatus of claim 4, wherein:
   when the first reception quality is better than the second reception quality, the estimator estimates that a source of interference against the second communicating party is present in a direction where the null has formed in the directivity pattern toward the first communicating party; and the generator generates the directivity pattern toward the second communicating party having a null in the direction in which said second communication party is estimated to be present.

6. The radio communication apparatus of claim 4, wherein:

when the first reception quality is poorer than the second reception quality, the estimator estimates that the second communicating party is present in a direction where the null has formed in the directivity pattern toward the first communicating party; and the generator generates the directivity pattern toward the second communicating party having a beam in the direction in which said second communication party is estimated to be present.

7. A directivity pattern generation method comprising:

(a) detecting a null in a directivity pattern that is formed toward the first communicating party;

(b) estimating a direction of a second communicating party, to which a directivity pattern has not formed, from the null detected in step (a); and (c) generating a directivity pattern toward the second communicating party according to an estimation result os step (b).

* * * * *